United States Patent [19]

Lecordier

[11] 3,943,982

[45] Mar. 16, 1976

[54] APPARATUS FOR INTERNALLY CHECKING WELL PIPE BORE AND FOR AUTOMATICALLY SEALING LEAKS THEREIN

[75] Inventor: Michel G. Lecordier, Marseille, France

[73] Assignees: Compagnie Francaise des Petroles, S.A., Paris Cedex; Etudes Petrolieres Marines, S.A.R.L., Paris; Ateliers et Chantiers de Bretagne - A.C.B. - S.A., Nantes; Compagnie Maritime d'Expertises, S.A., Marseille; Compagnie Generale pour les Developpements Operationnels des Richesses sour-Marines (Doris) S.A., Paris, all of France

[22] Filed: Aug. 19, 1974

[21] Appl. No.: 498,677

[30] Foreign Application Priority Data

Aug. 27, 1973  France .............................. 73.30931

[52] U.S. Cl. .................................................. 138/89
[51] Int. Cl.² ........................................... F16L 55/10

[58] Field of Search ............... 137/1, 15; 138/89, 90, 138/94, 94.3, 94.5; 61/72.1, 72.3

[56] References Cited

UNITED STATES PATENTS

| | | | |
|---|---|---|---|
| 3,746,026 | 7/1973 | Herring | 138/90 |
| 3,751,932 | 8/1973 | Matthews | 61/72.1 |
| 3,788,084 | 1/1974 | Matthews | 61/72.3 |
| 3,795,115 | 3/1974 | Bergquist | 61/72.3 |
| 3,842,612 | 10/1974 | Arnold | 138/89 |

*Primary Examiner*—Houston S. Bell, Jr.
*Attorney, Agent, or Firm*—Sughrue, Rothwell, Mion & Zinn

[57] ABSTRACT

Apparatus for checking the bore and for plugging a pipe comprises a frame movable along the interior of the pipe, the frame carrying means for detecting a deviation in the bore of the pipe, means responsive to an overpressure of fluid in the pipe in a direction opposite to that in which the apparatus is intended to move, and a movable control part responsive to the detection of a deviation and of an overpressure for operating locking means for locking the apparatus relative to the pipe and sealing means for sealing the pipe.

14 Claims, 5 Drawing Figures

APPARATUS FOR INTERNALLY CHECKING WELL PIPE BORE AND FOR AUTOMATICALLY SEALING LEAKS THEREIN

The invention relates to an apparatus for checking the inner surface and the fluid tightness of a pipe, particularly during the course of its immersion.

In order to immerse a pipe intended, for example, for connecting an underwater oilwell head to a land or sea distributor station, the pipe is generally constructed on board a laying-barge by progressively welding sections of pipe to one another and lowering them on to the bottom of the sea, making use of ramps for supporting the pipe between its immersed free end and the barge.

It may happen that, in spite of the special profile of the ramps, the immersed pipe overhangs and distorts. This distortion may be local or may be propagated along the pipe already laid in the event of buckling. The distortion may also bring about rupture of the pipe and entry of sea water into it.

These accidents necessitate immediate stoppage of the immersion, continuation of the operation only being resumed after raising of the portion deformed or destroyed by rupture and the substitution of one or more sections. Devices for scraping and checking the inner surface of a pipe are well known but these devices are not sufficient to automatically prevent entry of water into the whole pipe in the event of rupture.

These apparatus are capable of detecting geometric defects in the pipe along which they are moved but only emit a signal bringing about outside intervention a posteriori but not immediate intervention by the apparatus themselves.

The object of the present invention is an apparatus for checking the bore and for automatic pluging of a pipe, characterized in that it comprises a frame movable along the interior of a pipe, means for locking the apparatus relative to the pipe, means for sealing the pipe, a relatively movable control part, means for detecting a deviation greater than a preset value in the bore of the pipe, and means responding to an overpressure of a fluid exerted in a direction opposite to the direction of movement of the apparatus along the pipe, the locking and sealing means being operable by the movable control part in response to the deviation detecting means and overpressure responsive means.

The locking and sealing means may have a circular outer structure and bear against a bearer structure of the frame which is symmetrical with respect to the axis of the apparatus so that, in the event of detection of a deviation in the bore of the pipe greater than the preset value, the locking and sealing means will come to bear against the inner wall of the pipe and the frame, the frame and the locking and sealing means serving as bracing for the pipe after operation of the locking means.

Such apparatus has the advantage of preventing buckling of the pipe at the point at which the deviation in the bore has been detected and of avoiding its propagation.

Other advantages and characteristics of the invention will become apparent from the following description of an embodiment of the apparatus according to the invention, given by way of example only, with reference to the accompanying drawings.

Figure 1:
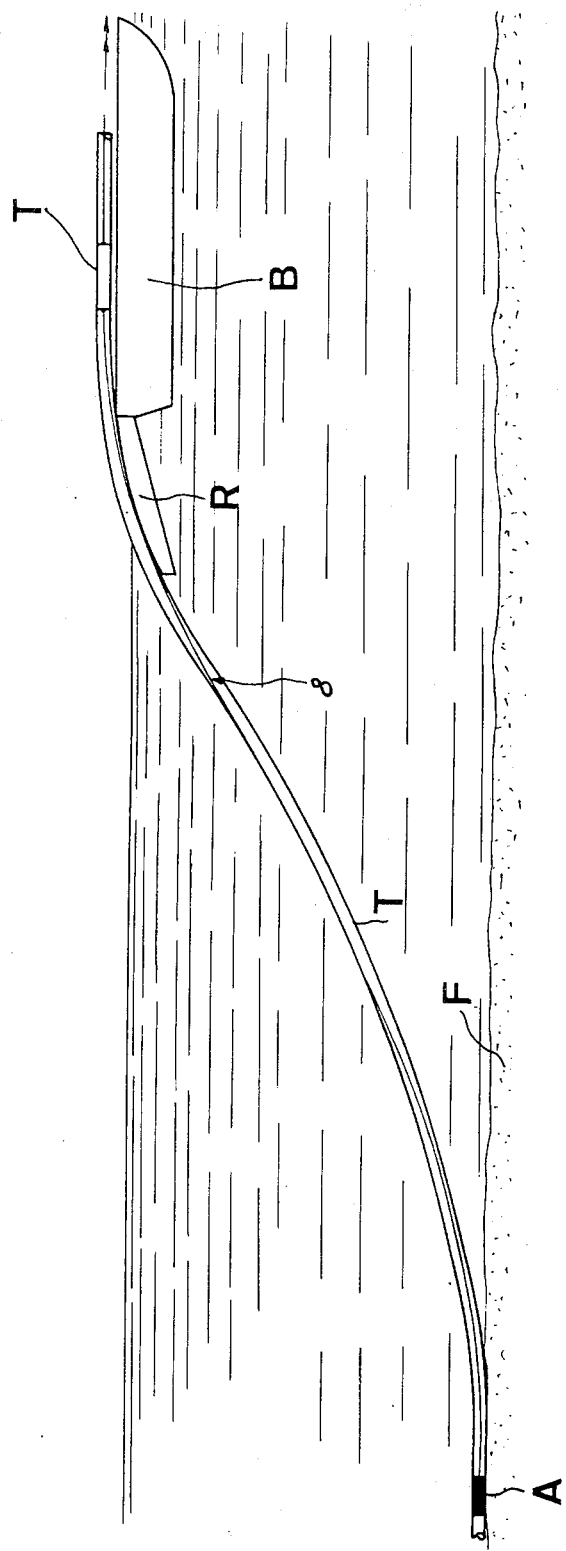
FIG. 1 is a diagrammatic representation of the immersion of a pipe.

In order to facilitate the explanation, reference will be made to FIG. 1 in which has been illustrated the construction and immersion of the pipe T by means of the laying-barge B. The latter includes all the handling devices and welding stations required for the construction of pipe T by simple welding of pipe elements. A ramp R of suitable profile gives the pipe T a slant enabling laying of it on the bottom F of the water without permanent distortion. The apparatus with which the invention is concerned is arranged at A slightly downstream of the spot at which the pipe ceases to rest on the bottom. During the course of the laying operation the barge B is moved to free a new portion of the pipe T whilst the apparatus is moved inside the pipe by a cable 8. A system of attachment and a winch (not shown) on the barge B enable the required pull to be exerted by the cable on the apparatus. As means for checking the pull may be of any kind they have not been shown.

Figure 2:
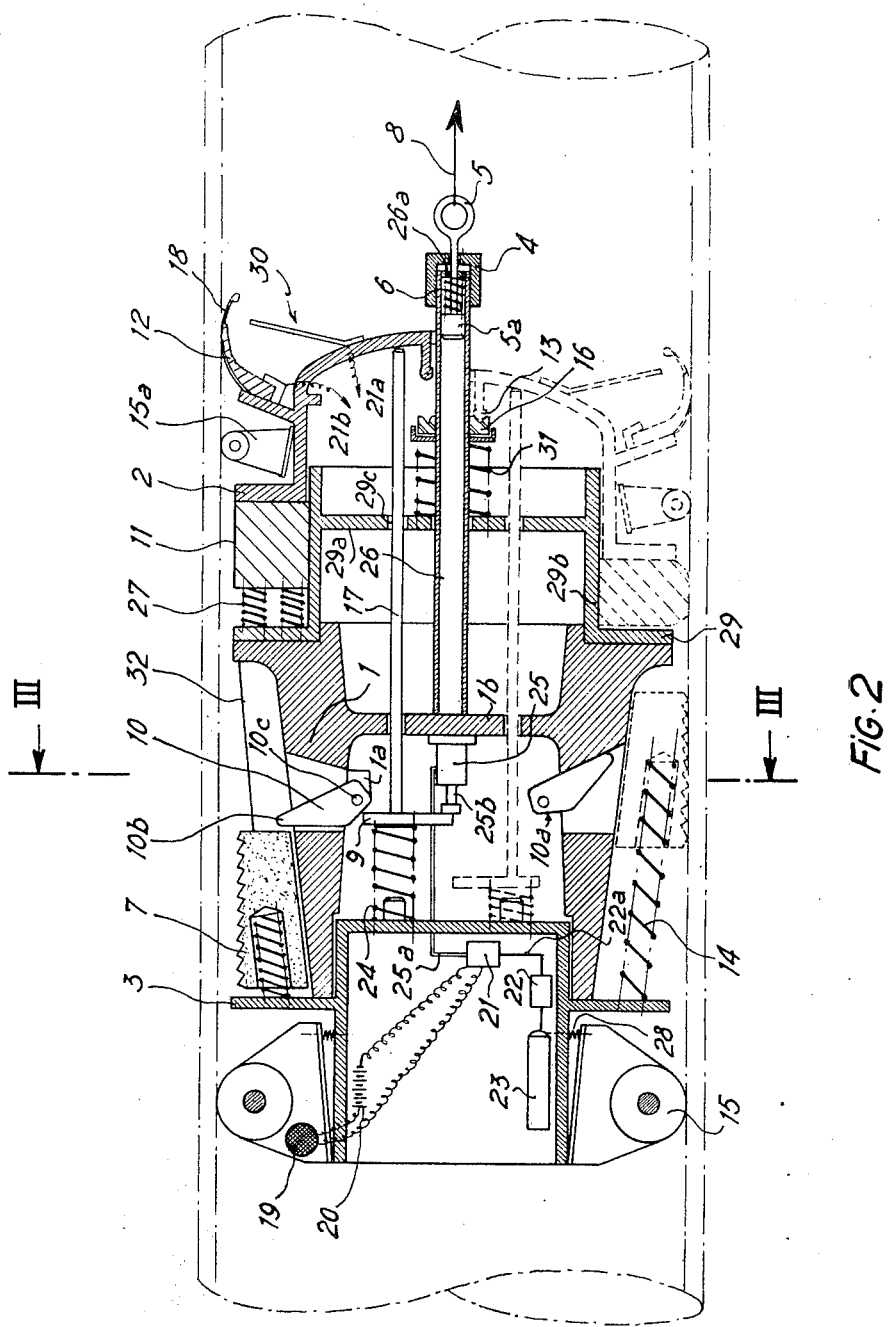
FIG. 2 is a diagrammatic section through the apparatus showing locking and sealing means in their locked and unlocked positions.

The cable 8 is, as shown in FIG. 2, fixed to a swivel 5. In order to avoid too violent deviations in the tension of the cable, the swivel transmits the force which it receives from the cable 8 to a drawbar 26 of the apparatus by means of a spring 6. For this purpose the spring 6 is located between the end 26a of the bar 26 and an enlarged end 5a of the swivel. A head 4 surrounding the end of the bar 26 completes the assembly. The bar 26 passes through a wall 29a of a facing 29 on a frame 1, which serves as the bearing surface for a compression seal 11. The bar 26 is fast with the frame 1 to which it may be welded.

A lip seal 12 fast with a movable part 2, which is capable of moving relative to a cylindrical portion 29b of the facing 29, carries metal blades 18 movable radially under the effect of variations in bore of the pipe T. The blades 18 urge the lip seal 12 inwardly of the pipe while remaining applied against the wall of the pipe and protect the seal. An electrically conductive plate 30 is mounted on a domed portion of the movable part 2 located at the front or leading end of the apparatus, the distance between the edge of the plate 30 and the ends of the blades 18 corresponding to a predetermined deformation of the pipt T. The plate 30 is electrically connected to a connecting lead 21a, and the blades 18 to a lead 21b. These leads are connected to a control device of a solenoid valve 21 which is supplied with current by an electric battery 20. The solenoid valve controls the supply of fluid, e.g. compressed air, to a jack 25 fixed on the frame 1 and is connected to a pipe 25a opening into the cylinder of the jack 25 and to a pipe 22a connected to a reducing-valve 22 supplied with compressed air from a bottle 23. The piston 25b of the jack 25 cooperates with a stop 9 which retains a latch 10 of a locking means 7 under the effect of a spring 24.

Figure 3:
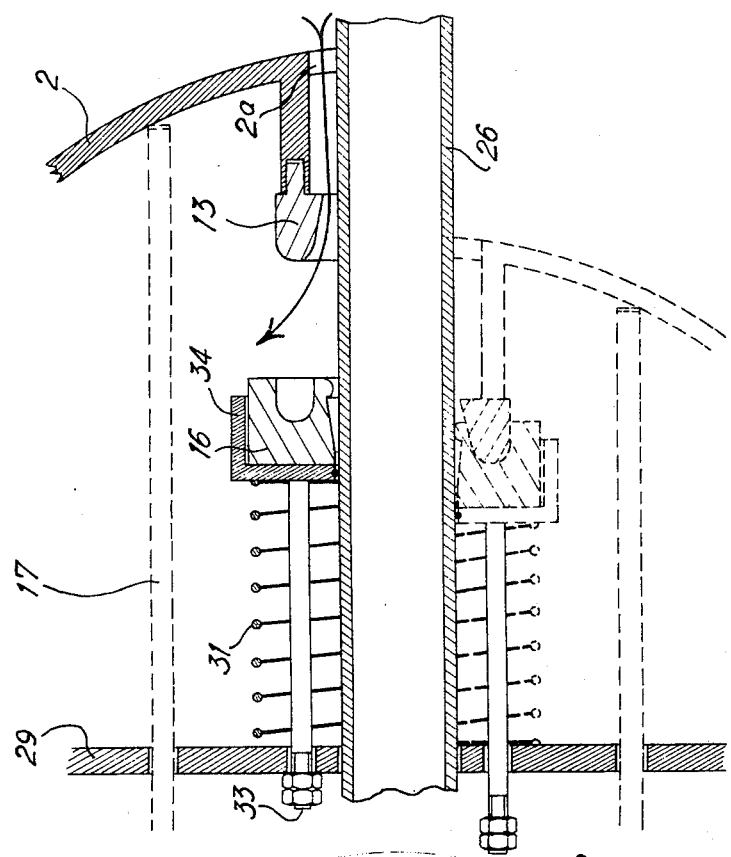
FIG. 3 is a section of the apparatus in the locked position along the line III—III in FIG. 2.

As shown in FIG. 3, the latch 10 is composed of three identical parts hinged about pins 10c (FIG. 2) fixed to supports 1a of the frame 1, such that when the stop-plate 9 bears against the inner ends 10a the outer ends 10b retain the locking means 7. The locking means 7 is composed of the three parts 7b bearing claws on their outer peripheral surfaces and three similar parts 7a so as to distribute the locking forces as uniformly as possible over the internal surface of the pipe T. The retaining force of the latches 10 is transmitted to the parts 7a by lugs 7c (FIGS. 3 and 5) at the sides of the parts 7b.

T-section rods 32 fast with the frame 1 serve as guides for the locking parts 7a and 7b, each of which have a lateral groove cooperating with a flange of a section 32. Springs 14 urge the locking parts 7a and 7b against the latch 10.

Figure 4:
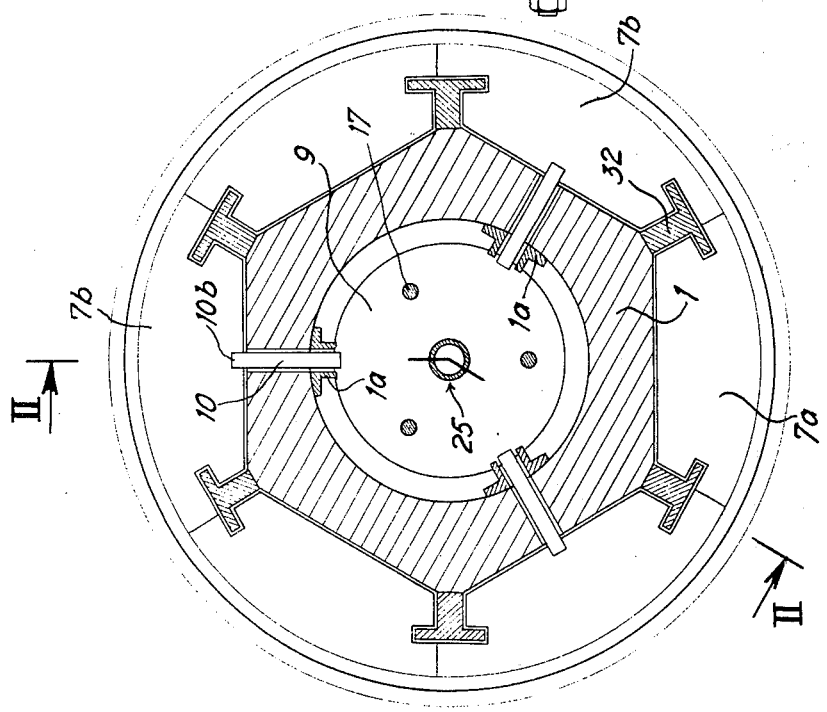
FIG. 4 is an enlarged view of the front central portion of the apparatus.

The stop-plate 9, urged by the springs 24, is connected to rods 17 sliding through openings 1b in the frame 1, and openings 29c in the wall 29a. These rods contact the domed surface of the movable part 2. The latter has at its centre a cylindrical passage 2a (FIG. 4) to enable flow of air when the apparatus is moved in the pipe T. The end of the passage is completed by a nozzle 13 arranged opposite a watertight seal 16 supported by a seat 34 sliding on the bar 26. The seal 16 has an annular groove serving as a seating for the nozzle 13 when the movable part 2 is pushed back downstream under the action of the pressure of water, for example. A spring 31 enables the impact of the nozzle against the seal 16 to be damped during its penetration into its seating up to the end of the travel of the movable part 2.

Rollers 15 each mounted on an articulated support 15a urged by a spring 28 enable free movement of the apparatus in the pipe, the blades 18 exerting only very slight friction and having no other purpose than following the profile of the inner surface of the tube. One of the rollers drives a rotary counter 19 for measuring the movement of recoil of the apparatus in the event of breakage of the cable 8, for example.

If in the course of the movement of the apparatus with respect to the pipe T, the blades 18 detect a variation in the bore of the pipe T resulting, for example, from a fold and the deformation is sufficient to cause contact between the edge of the plate 30 and a blade 18, the control device for the solenoid valve 21 is excited through the leads 21a and 21b. The piston 25b is thereby moved towards the rear of the apparatus pushing back the stop-plate 9 and compressing the springs 24. The latches 10 thus freed allow the locking parts 7 to slide over a conical portion of the frame 1, i.e. a portion whose surface is not parallel to the peripheral surfaces of the locking parts 7a and 7b, under the action of the springs 14 bearing against an annular plate 3 of the frame 1, to take up the position illustrated in the lower portion of FIG. 2. Because of the pull exerted on the cable 8 the apparatus continues to advance until the annular portion of the movable part 2 locks against the deformation of the pipe. The springs 27 and the joint 11 are compressed until the means for limiting the tension exerted on the cable relaxes this tension — for example, by means of a limited-tension drum used for reeling the cable. By way of example, the springs 27 may be calibrated at 30.000 N and the drum at 50.000 N. As soon as the tension on the cable is relaxed the springs 27 bearing against the compressed joint 11, which is fixed with respect to the pipe, extend slightly to bring about definite anchorage of the claws of the locking means 7. It will be observed again that the frame and the locking means then ensure sufficient strength to oppose any propagation of the buckling.

If a split in the pipe T causes an accumulation of water against the movable part 2 without a deformation in the pipe having been detected, the apparatus can still lock itself against the pipe under the effect of the overpressure of the water exerted against the domed end of the movable part 2 because of the lip seal 12 and the introduction of the nozzle 13 into the groove in the seal 16. The part 2 pushes back the sliding rods 17 and compressing the springs 24 as indicated above until the latches 10 are completely freed, and causes compression of the springs 27 and the seal 11.

In the event of shearing of the cable 8 the apparatus may recoil under the pressure of the water until the rotary counter 19, driven solely by a recoil movement, trips an automatic control of the solenoid valve 21 to bring about freeing of the latches 10 and consequent projection of the locking parts 7 against the inner surface of the pipe T and immediate anchoring of the apparatus.

Figure 5:
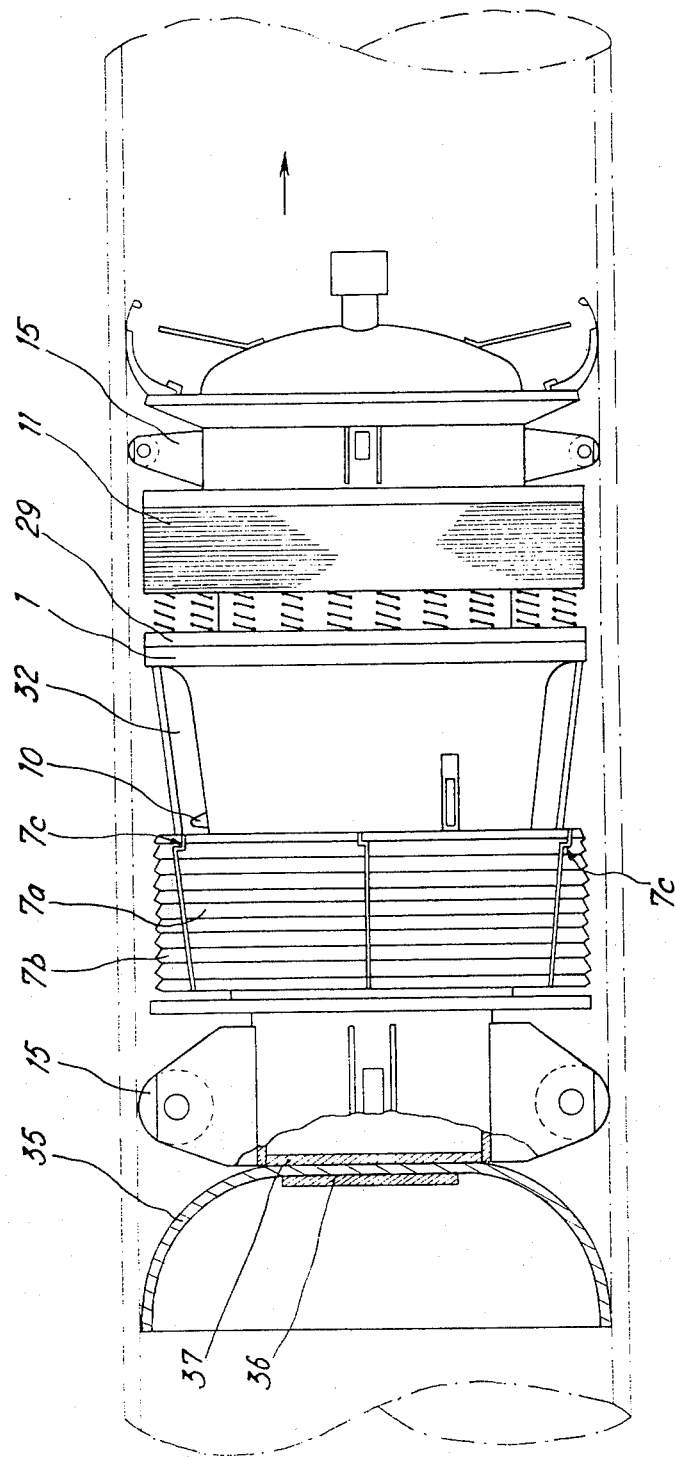
FIG. 5 is a side view, partially sectioned, of a modification of the apparatus.

In FIG. 5 there is illustrated a side view of the above described apparatus to which has been added to the rear end of the frame 1 a plate 37 to which has been fixed a cup 35 retained by a base 36. With this modification the apparatus may be employed not only as above described with a cable but also without a cable, the movement of the apparatus being ensured by the difference between the pressures exerted by the fluids in contact with its opposite ends. Thus when a driving fluid acting on the cup 35 moves the apparatus, the apparatus will still perform as above described and anchor itself automatically, for example, upon detection of bulky deposits reducing the inner diameter of the pipe.

Numerous detail modifications may be made to the above described apparatus without departing from the scope of the present invention. Thus, for example, the springs 27 may be compressed between an annular portion of the movable part 2 and a facing annular portion of the frame 1 and the seal 11 may be compressed between an annular portion of the frame 1 and the locking parts 7 when the latter are moved forwards by their spring 14.

The rods 17 may be used as drive bars by fixing them to the frame 1 and connecting them to the cable 8 by passing them through the domed portion of the movable part 2. The central rod 26 may then be used to operate the stop 9 by passing it through the frame 1 and subordinating it to the movable part 2.

It would still be possible to drive the movable portion 2 by the cable 8, stopping of the apparatus being still effected by pressure exerted by an unwanted presence of water or by a diminution in the bore of the pipe. Compression of the springs 27 would still be able to be effected as above described independently of compression of the watertight seal 11, the springs 27 bearing on the downstream side against a portion of the movable part 2 and on the upstream side against a portion of the frame 1. It is therefore the frame which would carry the lip joint and which would be stopped under the pressure of the water or because of a narrow bore, causing in that fashion a variation in distance between the frame and the movable part, which serves to trigger the freeing of the anchoring device by displacement of the stop 9 as has already been described.

What is claimed is:

1. In an apparatus for plugging the bore of a pipe, and including a frame movable along the interior of a pipe, means for locking the apparatus relative to the pipe, means for sealing the pipe, and control means movable relative to the frame and operably connected to the locking means and the sealing means, the improvements comprising: a) means for detecting a linear deviation greater than a preset value in the bore of the pipe, and b) means responsive to a fluid overpresssre exerted in a direction opposite to the direction of movement of the apparatus along the pipe, c) the locking means and the sealing means being operable by the movable control means in response to the deviation detecting means and the overpressure responsive means.

2. Apparatus as claimed in claim 1, in which the locking means comprises an assembly of parts the outer peripheral surfaces of which are of generally cylindrical shape and carry claws, the opposed surfaces being inclined relative to the peripheral surfaces and bearing against the frame, the cylindrical peripheral surfaces being adapted to engage the inner surface of a pipe when the locking means are operated.

3. Apparatus as claimed in claim 1, in which the sealing means comprises a resilient seal which is compressed during displacement of the control means withh respect to the frame.

4. Apparatus as claimed in claim 1, in which the means responding to fluid overpressure is a lip seal coupled to the deviation detecting means, the movable control means being displaceable parallel to the axis of the frame in a direction, opposite the direction of movement of the apparatus along a tube, in response to a fluid over-pressure to actuate the locking means.

5. Apparatus as claimed in claim 1, in which the movable control means comprises a body supporting the deviation detecting means and a movable stop, the stop being urged against the body and, in a first position, holding the locking means inoperative and, in a second position, freeing the locking means for operation.

6. Apparatus as claimed in claim 5, in which the deviation detecting means comprises at least one metal blade for contacting the wall of the pipe and urging a lip seal inwardly of the pipe, and a metal plate mounted on the body, the blade and the plate being incorporated in an electrical control circuit including a solenoid valve which is connected in the feed circuit of a jack for moving the stop.

7. Apparatus as claimed in claim 3, in which the movable control means comprises an annular portion bearing against the resilient seal, and springs are provided bearing against an annular portion of the frame to retain the seal.

8. Apparatus as claimed in claim 3 in which the movable control means comprises an annular portion bearing against springs retained by an annular portion of the frame and the seal bears against the frame and the wall of the pipe under the action of the locking means when operated.

9. Apparatus as claimed in claim 3, in which the movable control means comprises a body movable with respect to the frame and a stop for holding the locking means inoperative, the stop being movable with respect to the body and being carried by at least one rod, a spring bearing against the frame and the stop urging the rod against the movable body.

10. Apparatus as claimed in claim 6, in which the stop is formed by a plate fast with a rod, the plate being biased by a spring bearing against the frame to apply the rod against the movable body and by the jack bearing against the frame, the plate retaining the locking means inoperative by at least one latch.

11. Apparatus as claimed in claim 3, in which the control means has a central outwardly domed surface and is slidable along a central bar fast with the frame, the central and sliding portions of the control means defining a nozzle for fluid, the tip of which nozzle is engageable in a seat in a fluid tight seal serving as a stop and supported by springs which are compressed by bearing against the frame when the movable part is displaced inwardly of the frame.

12. Apparatus as claimed in claim 4, in which the frame has roller supports, at least one of the rollers being coupled to drive a revolution counter means on recoil of the apparatus, the said counter means being connected in a circuit including the solenoid valve for operating the jack after a predetermined recoil travel of the apparatus.

13. Apparatus as claimed in claim 1, in which at the rear end the frame carries a cup for moving the apparatus forwards under the pressure of a fluid applied thereagainst.

14. Apparatus as claimed in claim 1, in which means is provided coupled to the frame for drawing the apparatus along the tube.

* * * * *